(12) United States Patent
Jacquin et al.

(10) Patent No.: US 6,834,145 B2
(45) Date of Patent: Dec. 21, 2004

(54) 2 TO N OPTICAL DIVIDER WITH INTEGRATED OPTICS

(75) Inventors: Olivier Jacquin, Grenoble (FR); Cyril Guidoux, Grenoble (FR)

(73) Assignee: Teem Photonics, Meylan (FR)

( * ) Notice: Subject to any disclaimer, the term of this patent is extended or adjusted under 35 U.S.C. 154(b) by 0 days.

(21) Appl. No.: 10/698,931

(22) Filed: Nov. 3, 2003

(65) Prior Publication Data

US 2004/0141690 A1 Jul. 22, 2004

Related U.S. Application Data

(60) Provisional application No. 60/427,923, filed on Nov. 21, 2002.

(30) Foreign Application Priority Data

Nov. 4, 2002 (FR) .......................................... 02 13747

(51) Int. Cl.[7] ................................................ G02B 6/26
(52) U.S. Cl. ............................. 385/39; 385/42; 385/43; 385/48; 385/129
(58) Field of Search .............................. 385/39, 42–45, 385/48–52, 129–132

(56) References Cited

U.S. PATENT DOCUMENTS

| | | | | |
|---|---|---|---|---|
| 5,011,251 A | * | 4/1991 | Miller et al. ................... | 385/43 |
| 5,295,210 A | * | 3/1994 | Nolan et al. .................... | 385/43 |
| RE35,138 E | * | 1/1996 | Weidman ....................... | 385/42 |
| 5,647,040 A | * | 7/1997 | Modavis et al. ............... | 385/42 |
| 6,222,959 B1 | | 4/2001 | Evans .......................... | 385/27 |

FOREIGN PATENT DOCUMENTS

| | | |
|---|---|---|
| EP | 0 432 421 A2 | 6/1991 |
| EP | 0 527 425 A1 | 2/1993 |
| EP | 0 661 560 A1 | 7/1995 |
| EP | 0 707 222 A1 | 4/1996 |
| WO | WO 02/063389 A1 | 8/2002 |

OTHER PUBLICATIONS

A. Takagi, K. Jinguji, and M. Kawachi, "Wavelength Characteristics of (2×2) Optical Channel–Type Directional Couplers with Symmetric or Nonsymmetric Coupling Structures," 8217 Journal of Lightwave Technology, IEEE (New York), vol. 10 (No. 6), p. 735–746 (Jun. 1992).

* cited by examiner

Primary Examiner—John D. Lee
(74) Attorney, Agent, or Firm—Pillsbury Winthrop LLP

(57) ABSTRACT

A 2 to n divider with integrated optics, where n is an integer greater than or equal to 2, including at least one 2 to 2 optical divider element in a substrate. The optical divider element comprises a first and a second guide with widths equal to W1 and W2, respectively. The first and second guides are suitable for dividing an input light wave input into one of the guides, into a first and second output wave transported by the first and second guides respectively according to a determined division ratio. These first and second guides have at least three parts. A first part where the first and second guides move toward each other, a second part where the first and second guides are approximately parallel to each other and a third part where the first and second guides gradually separate from each other.

11 Claims, 4 Drawing Sheets

2 TO N OPTICAL DIVIDER WITH INTEGRATED OPTICS

CROSS-REFERENCE TO RELATED APPLICATIONS

This application is based on and claims priority to U.S. provisional application No. 60/427,923 filed Nov. 21, 2002, and to application no. 0213747 filed Nov. 4, 2002 in France, the entire contents of each of which are hereby incorporated by reference.

BACKGROUND OF THE INVENTION

1. Field of the Invention

The present invention relates to a 2 to n optical divider with integrated optics. More particularly, it relates to an optical divider that may find use in the field of optical telecommunications, such as, in the 1260–1360 nm and 1480–1660 nm spectral windows.

2. Description of Related Art

A 2 to n optical divider (where n is an integer greater than or equal to 2) includes at least one optical divider element comprising 2 inputs and 2 outputs to divide a light wave injected into one of the inputs into 2 parts. The light is distributed to each of the outputs with a predefined division ratio.

When n is more than 2, the optical divider comprises several cascaded divider elements so as to have 2 inputs and n outputs and enable the distribution of a light wave injected into one of the two inputs, to the n outputs according to a predefined division ratio for each of the outputs.

U.S. Pat. No. 5,835,651 describes a conventional 2 to 2 divider.

FIG. 1 diagrammatically shows a conventional 2 to 2 divider of this type made with integrated optics, in the xy plane of the substrate containing the divider.

In this figure, the substrate in which the divider is made is not shown. FIG. 1 shows first and second single-mode input wave guides 1 and 3, first and second single-mode output wave guides 5 and 7 and a dual-mode wave guide 9 with length La along the x axis and width Wa along the y axis. The dual-mode wave guide 9 connects the input wave guides and the output wave guides. The input and output wave guides are connected to the dual-mode guide at an angle $\beta$ from the x axis.

With this divider, a light wave Ea injected into one of the single-mode input guides, for example guide 1, propagates in the guide in the direction of the dual-mode guide 9 and becomes closer to the second input guide 3, thus, setting up a proximity coupling with the second input guide. This proximity coupling is greater for higher wavelengths (such as wavelengths within the 1480–1660 nm spectral band) than for lower wavelengths (such as wavelengths in the 1260–1360 nm spectral band).

At the end of the single-mode input guides 1, 3, the light wave is coupled to the two modes of the dual-mode guide 9. The spectral behavior of coupling between these two modes during propagation in the dual-mode guide is contrary to the behavior in single-mode guides. In other words, coupling for higher wavelengths (1480–1660 nm) is weaker than for lower wavelengths (1260–1360 nm).

At the output from the dual-mode guide 9, the light wave is coupled with a given distribution onto the two single-mode output guides 5, 7. The light wave is once again affected by proximity coupling, until the single-mode guides have separated by a distance H such that the light wave propagating in each single-mode guide no longer sees the other-guide.

As a result, a light wave Ea is distributed into two light waves S1a, S2a in the two single-mode output guides 5, 7.

The spectral behavior in the single-mode input and output guides that is contrary to the spectral behavior in the dual-mode guide, allows the creation of a 2 to 2 achromatic divider in the dual-mode guide, for selected values of $\beta$, Wa and La. For example, a low value of $\beta$ limits excess losses.

Although it is satisfactory in some respects, that the light wave in this 2 to 2 divider be affected by a discontinuity at each end of the dual-mode guide connected to the single-mode guides creating mismatch losses between the modes of the dual-mode guide and the modes of the single-mode guides, and reflection losses. These mismatch and reflection losses are particularly annoying for applications in the optical telecommunications field.

Moreover, as shown previously, excess losses and achromatism depend on $\beta$. On one hand, $\beta$ must increase to reduce chromatism. On the other hand, $\beta$ must decrease to reduce excess losses. This behavior of the divider makes it difficult to make a 2 to 2 divider with good achromatism and low excess losses.

BRIEF SUMMARY OF THE INVENTION

An aspect of embodiments of this invention is to provide a 2 to n optical divider with integrated optics without the limitations and difficulties of conventional dividers.

In particular, one aspect of embodiments of the invention is to provide a 2 to n divider with low excess losses and satisfactory achromatism, particularly for optical telecommunications in all of the 1260–1360 nm and 1480–1660 nm spectral windows. The divider, according to one embodiment of the invention, is advantageously very slightly chromatic or even achromatic, and has minimum excess losses.

In the remainder of the description, achromatic refers to either low chromatism (for example <0.5 dB for telecommunications spectral windows) or "perfect" achromatism.

A further aspect of the invention is to make a 2 to n divider in which excess losses and chromatism are independent to facilitate its application.

Another aspect of the invention is to provide a 2 to n divider without any discontinuities for the light wave so as to limit mismatch and reflection losses.

In one embodiment of the invention, the 2 to n divider with integrated optics, with n being an integer greater than or equal to 2, comprises at least one 2 to 2 optical divider, element in a substrate. This element comprises a first and a second guide, with widths equal to W1 and W2 respectively, suitable for dividing an input light wave E input in one of the guides, into a first and second output wave S1 and S2 transported by the first and second guides, respectively. These first and second guides have at least three parts:

a first part, of a first coupling type, in which the first and second guides progressively move towards each other, until a distance Dc that is not zero and is less than a threshold distance Ds corresponding to the minimum distance starting from which the input light wave input into one of the guides can be at least partly coupled in the other guide, a second part, of a second coupling type, with length Lc, called the coupling length, in which the guides are approximately parallel to each other and are distant by the value Dc, and a third part, of a first coupling type, in which the guides gradually separate starting from the value Dc until they are separated by a value of more, than Ds.

The values Dc, Lc, W1 and W2 are chosen so as to obtain an achromatic divider element at the divider operating wavelengths. The values Dc and Lc are chosen so that the first coupling type and the second coupling type vary inversely with the wavelengths.

The light wave is divided with a division ratio CR related to the output of one of the first or second guides (by convention).

In the present description, an optical guide is a guide with lateral confinement, unlike a planar guide in which light can propagate within a plane (the guide plane).

The optical guides according to one embodiment of the invention are preferably single-mode.

An optical guide is composed of a central part generally called the core and media surrounding the core that may be identical to each other or different from each other.

To enable confinement of light in the core, the refraction index of the medium from which the core is made must be different and in most cases greater than the refraction index of the surrounding media.

To simplify that description, the guide will be considered to consist of the central part of the core. Furthermore, all or part of the surrounding media will be called the substrate. However, one of ordinary skill in the art would understand that when the guide is not buried or is only slightly buried, one of the surrounding media may be outside the substrate and may for example be air.

The substrate may be a single-layer or a multi-layer, depending on the type of technique used.

Furthermore, depending on the application, an optical guide in a substrate may be more or less buried in the substrate and particularly may comprise portions of the guide buried at variable depths. This is particularly true in the technology for ion exchanges in glass.

According to one embodiment, the divider is made with integrated optics in a glass substrate using ion exchange techniques.

According to one embodiment of the invention, dedicated particularly to telecommunications applications, the first and the second guides have widths W1 and W2 such that the behavior of the divider element based on Dc and Lc is achromatic in the operations spectral windows from 1260 to 1360 nm and from 1480 to 1660 nm.

We will usually choose W1=W2=W.

Preferably, the guides become closer to each other and/or separate from each other symmetrically.

Excess losses C may be defined using the following equation:

$$C = 10 \log (P_{S1} + P_{S2})/P_E$$

where $P_{S1}$, $P_{S2}$, $P_E$ are the powers of waves S1, S2 and E, respectively.

The choice of values Dc, Lc, W1 and W2 provides a means for compensating for light coupling phenomena between the two guides that are different depending on the wavelengths, and thus create an achromatic divider element.

When the distance D between the guides is more than the value Ds, there is no coupling between the guides. When the distance D between the guides is between the distance Ds and a distance Dx, the guides set up a weak proximity coupling that is greater for high wavelengths (for example 1480–1660 nm) than for low wavelengths (for example 1260–1360 nm). On the other hand, when the distance D between the guides becomes smaller and is between Dx and Dc, the operating conditions are changed and the phenomenon involved is then a strong proximity coupling that is weaker for higher wavelengths (for example 1480–1660 nm) than for lower wavelengths (for example 1260–1360 nm). This strong proximity coupling is made particularly on the length Lc of the second part.

Furthermore, since Dc is not zero, the light wave is not affected by any discontinuity in this divider element, which results in very small excess losses. In one preferred embodiment, Dc must be greater than Dmin, where Dmin= 0.5 μm.

The value Dx can be defined as being the distance separating the two guides starting from which the proximity coupling is inverted from strong to weak and vice versa.

The 2 to 2 divider element made according to the invention may be considered as comprising two types of proximity couplers; a first type of coupler operating globally in the weak coupling conditions, corresponding to parts I and III of the divider itself if strong coupling zones can exist in these parts, depending on the value of Dx; and a second type of coupler operating in the strong coupling condition corresponding to part II of the divider.

Moreover, in parts I and III of the divider element corresponding to weak coupling, the guides can be brought close to each other and/or separated from each other moving along an arc of a circle with a radius R>Rc. The value Rc is defined as being the critical radius of curvature above which there are no longer any curvature losses at the highest wavelength in the spectral window considered (for example 1260–1360 nm and 1480–1660 nm). This value Rc is defined in order to minimize excess losses of the 2 to 2 divider element.

In one of the embodiments, the radius R will be taken equal to Rc in order to minimize weak proximity coupling.

Furthermore, as R becomes smaller, the divider element will become more compact. Therefore there is a two-fold advantage in choosing R=Rc.

In the case of a 2 to n divider with integrated optics, where n is an integer greater than 2, this divider comprises a 2 to 2 optical divider element in the substrate like the one described above, and n–2 cascaded 1 to 2 divider elements such that the divider comprises 2 inputs corresponding to the 2 to 2 divider element input guides and n outputs.

The 1 to 2 divider elements are selected from among Y couplers or junctions These divider elements may or may not be symmetric.

An asymmetric divider element may be obtained in case of a coupler, by varying the coupler interaction length and/or the selection of the different coupler output channels.

An asymmetric divider element may be obtained in the case in which a Y junction is used by varying the section of the output channels from the junction and/or the angle between the output channels from the junction and the optical axis of the junction input channel.

Other specific features and aspects of the invention will become apparent when taken with the detailed description and examining the attached drawings.

DETAILED DESCRIPTION OF THE INVENTION

Figure 1:
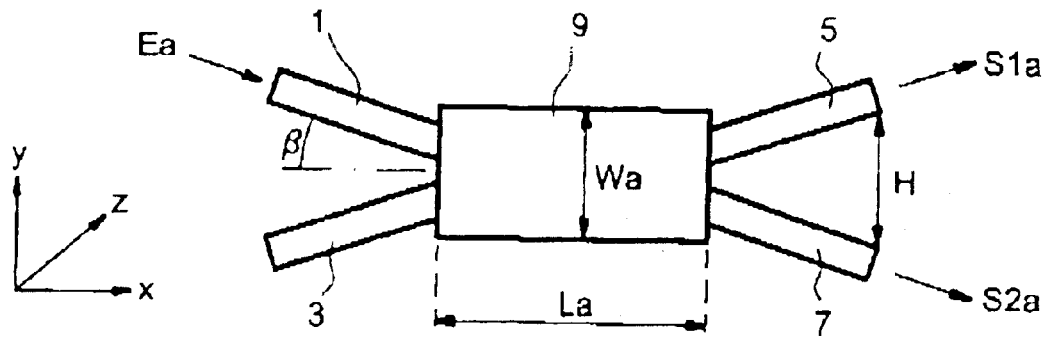
FIG. 1, already described, diagrammatically shows a known 2 to 2 divider.
Figure 2:
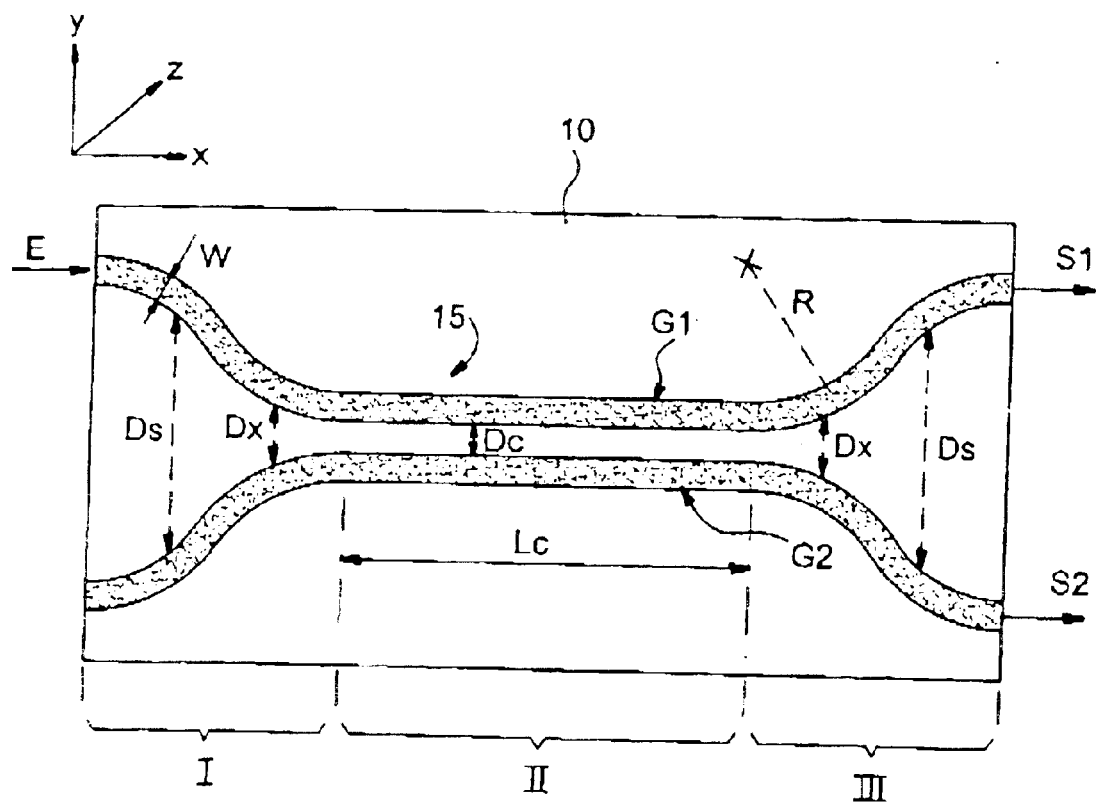
FIG. 2 diagrammatically shows a section through a 2 to 2 divider according to an embodiment of the invention.

FIG. 2 diagrammatically shows an example of a 2 to 2 divider formed by a 2 to 2 divider element according to the invention, capable of dividing a light wave E into two parts S1 and S2 with a division ratio of CR.

This diagram shows a partial section of a substrate 10 in an xy plane containing the different propagation directions of the light waves E, S1 and S2 in the optical guides of this element.

This divider element comprises first and second, for example, single-mode guides, G1 and G2 in the substrate 10. In this example, the widths W of these guides are identical. They are combined together so as to divide an input light wave E input into one of the guides (for example G1) into first and second output waves S1 and S2 with a division ratio CR. The wave S1 is transported by guide G1 and the wave S2 is transported by guide G2. If the light wave E is input into the divider from the guide G2, then the guides G1 and G2 provide waves S1 and S2 on their outputs with a division ratio CR. These waves may be different from the waves produced by the divider when the wave E is input by the guide G1.

Guides G1 and G2 each have at least three parts:

a first part I in which the guides G1 and G2 gradually move towards each other until the distance Dc that is not zero and is less than a threshold distance Dx corresponding to the minimum distance from which the input light wave E input into one of the guides sees the other guide, a second part II with length Lc called the coupling length in which the guides G1 and G2 are parallel to each other and are not equal to the value Dc, and a third part III in which the guides gradually move away from the value Dc to a value of more than Ds.

The values Dc, Lc and W are selected so as to have an achromatic divider element at operating wavelengths.

The distances Ds, Dc, are measured along the y direction of the plane of the section in the figure, while the length Lc is measured along the x direction of this plane.

For a 2 to 2 divider element, excess losses and satisfactory chromatism mean excess losses less than 0.2 dB (particularly for all 1260–1360 nm and 1480–1660 nm spectral windows) and achromatism less than 0.5 dB (for all of these windows).

The invention is applicable to all domains for which a 2 to n optical function is necessary and more particularly to telecommunications fields.

In the telecommunications field, operating wavelengths are usually within the 1260–1360 nm and 1480–1660 nm spectral windows.

These optical guides may be made in the substrate using any type of technique and particularly ion exchange techniques or deposition and etching techniques. Guides may be delimited by appropriate masking. These techniques are well known in the integrated optics field.

The substrate may be a single-layer substrate or a multilayer substrate, depending on the type of technique used. For example, the substrate may be glass in the case of ion exchange techniques.

With this type of divider, a light wave E input into the guide G1 propagates in the guide G1 moving gradually towards the guide G2, thus creating a coupling of proximity with the guide G2 as soon as the distance between guides G1 and G2 is less than the threshold value Ds (where Ds is the minimum distance at which the two guides see each other at the operating wavelengths considered). As long as the distance D between the two guides G1 and G2 is not too small, the phenomenon involved is a weak proximity coupling which is greater for high wavelengths (for example 1480–1660 nm) than for low wavelengths (for example 1260–1360 nm). On the other hand, when the distance D between the single-mode guides becomes smaller, the operating conditions change and the phenomenon involved becomes a strong proximity coupling which is weaker for high wavelengths (for example 1480–1660 nm) than for low wavelengths (for example 1260–1360 nm).

The change in the operating conditions takes place with the distance Dx between, the guides is between the values Ds and Dc.

Thus, in the part I, the proximity coupling between the guides changes from zero coupling (when Ds>D>Dx) that is stronger for higher wavelengths than for lower wavelengths. The proximity coupling between the guides then changes from weak coupling (when Ds>D>Dx) to strong coupling (when Dx≧D≧Dc) which is stronger for low wavelengths than for high wavelengths. This strong proximity coupling is maintained in part II in which the distance D between guides G1 and G2 is equal to Dc (Dx≧Dc). Finally, in part III, the coupling changes once again from strong coupling (when Dx≧D≧Dc) to weak coupling (when Ds>D>Dx) and similarly to above, with a reversal of the coupling behavior for high and low wavelengths. Finally, there is no longer any coupling between the two guides for a distance D between the guides greater than Ds.

Thus, the result is a light wave E distributed in two waves S1 and S2 in the two single-mode guides G1 and G2. This contrary behavior between a weak proximity coupling and a strong proximity coupling can be applied to make an achromatic divider element for selected values of Dc, W and Lc, as a result of a compensation phenomenon. Moreover, since Dc is not zero in this device, the light wave is not affected by any discontinuity, such tat excess losses are very low and dependence between excess losses and chromatism is eliminated. Dc is more than 0 and in one of the embodiments, Dc must be greater than Dmin where Dmin is equal to 0.5 μm.

The free parameters used to modify chromatism are Dc, W and Lc, with Lc being less useful as will become clearer from the rest of the description. Dc, W and Lc have very little influence on excess losses, thus also making these values and the chromatism independent of each other. This independence also facilitates implementation of the 2 to 2 divider element.

As we have already seen, the guides can be brought closer to each other along an arc of a circle with radius R≧Rc, or with a sine type function with a radius or curvature R such that R≧Rc. Rc is defined as being the critical radius of curvature beyond which there are no losses of curvature at the highest wavelength of the spectral operations windows considered (for example 1260–1360 nm and 1480–1660 nm), in order to minimize excess losses in the 2 to 2 divider element.

In one of the embodiments, the radius R will be taken equal to Rc in order to minimize weak proximity coupling. For example, Rc=30000 μm.

The divider element is capable of dividing a wave E into two parts using a division ratio CR such that:

$$CR = P_{S2}/(P_{S1}+P_{S2})$$

with respect to guide G2 (equation 1) or $$CR = P_{S1}/(P_{S1}+P_{S2})$$

with respect to guide G1,
where $P_{S1}$, $P_{S2}$ are the luminous powers of the light waves S1 and S2 respectively.

Furthermore, as already shown, the 2 to 2 divider element made according to one embodiment of the invention can be assumed to act like two types of proximity couplers: a first type of coupler operating globally in the weak coupling conditions corresponding to parts I and III of the divider even if, depending on the value of Dx, there may be strong coupling zones in these parts; and a second type of coupler operating under strong coupling conditions corresponding to part II of the divider.

In general, for the wave amplitude, the transfer matrix Ti of a coupler I is written as follows:

$$T_1 = \begin{Bmatrix} \cos(K_i L_i) \sin(K_i L_i) \\ \sin(K_i L_i) \cos(K_i L_i) \end{Bmatrix}$$

Since the divider element of the 2 to 2 invention acts like two couplers placed one behind the other, if a light wave E is injected into the guide G1, the luminous output power of the guide G2 can be written as follows:

$$P_{S2} = (P_{S1}+P_{S2}) \cdot [\sin(K_1 \cdot L_1) \cdot \cos(K_2 \cdot L_2) + \cos(K_1 \cdot L_1) \cdot \sin(K_2 \cdot L_2)]^2,$$

namely:

$$P_{S2} = (P_{S1}+P_{S2}) \cdot \sin^2(K_1 \cdot L_1 + K_2 \cdot L_2) \quad \text{(equation 2)}$$

where K1 and L1 are the parameters fo the effective coupler associated with the converging arms in parts I and III, and K2 and L2 are the parameters of the coupler with strong coupling associated with part II. Thus, $K1 = K_{weak}$, $L1 = L_{eff}$ and $K2 = K_{strong}$, $L2 = Lc$. The coupling coefficients Ki are functions of $\lambda$, the width W of the guides and the distance D separating them respectively.

Therefore, equations 1 and 2 can be used to write the division ratio CR (for example with respect to the guide G2) in the form of a sinusoidal function, particularly of Lc:

$$CR = \sin^2(K_{weak}(\lambda, W, D_{eff}) \cdot L_{eff} + K_{strong}(\lambda, W, Dc) \cdot Lc) \quad \text{(equation 3)}$$

where $K_{weak}(\lambda, W, D_{eff})$ is the proximity coupling coefficient of the weak coupler with effective center to center distance $D_{eff}$ and the effective length $L_{eff}$ of the divider element that can be associated with guides G1 and G2 in the converging parts I and III, $\lambda$ is the wavelength of the light wave considered, $K_{strong}(\lambda, W, Dc)$ is the proximity coupling coefficient of the strong coupler with center to distance Dc and length Lc, of the divider element that can be associated with part II, W is the width of the single-mode guides of the 2 to 2 divider element.

The first coupler corresponding essentially to the curved convergence arms in part I and in part III of the guides G1 and G2 has a fairly large effective center-to-center distance $D_{eff}$ since it is equal to the average distance between the converging arms. Consequently, this coupler operates in the weak coupling conditions characterized by stronger coupling at high wavelengths than at low wavelengths. Therefore, $K_{weak}$ is an increasing function of $\lambda$ that depends on $D_{eff}$ and $L_{eff}$. These parameters are directly related to the average radius of curvature R of the curved converging arms of guides G1 and G2 in parts I and III. Coupling between the converging arms increases when R increases. Therefore, this coupling can be limited if R is as small as possible. To limit this coupling (to make R as small as possible) and also to limit excess losses (R≧Rc), it is advantageous to use R=Rc where Rc is defined as being the minimum radius of curvature beyond which there are no curvature losses at the highest wavelength of the spectral windows considered.

For example, Rc=30000 μm.

The second proximity coupler corresponds at least to part II in which the two guides G1 and G2 are approximately parallel and are at a distance of Dc. In this coupler, the distance Dc must be small so as to have strong coupling between guides G1 and G2. Thus, this coupler operates in a strong coupling condition for which coupling is greater at low wavelengths than at high wavelengths. Therefore, $K_{strong}$ is a decreasing function of $\lambda$, unlike $K_{weak}$. The coefficient $K_{strong}$ depends on the parameters W and Dc (when these parameters increase, the coupling coefficient $K_{strong}$ reduces), and on $\lambda$. It is recommended that Dc≧Dmin so as to limit any mode mismatch losses.

The contrary variation of $K_{weak}$ and $K_{strong}$ allows to have a division ratio between the two output arms of the guides G1 and G2 (in part III) that is only slightly dependent on $\lambda$. To achieve this, the variations of $K_{weak}$ and $K_{strong}$ as a function of $\lambda$ must be approximately identical but in opposite directions. Therefore, the parameters that can be varied to obtain this compensation between strong coupling and weak coupling are Dc and W.

Figure 3:
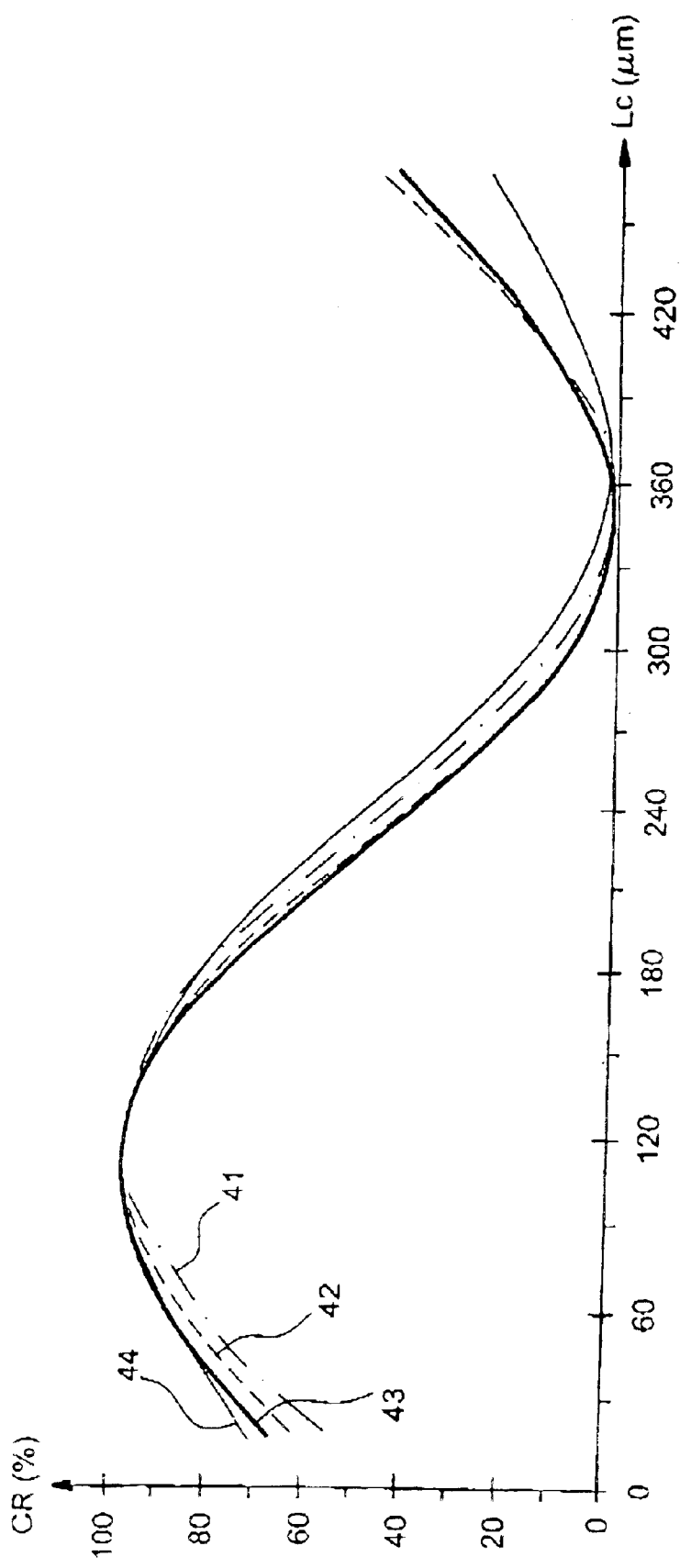
FIG. 3 diagrammatically shows graphs useful for setting parameters for the Dc, W and Lc characteristics of the divider element according to an embodiment of the invention.

FIG. 3 shows variations for CR as a function of Lc for different wavelengths for values of Dc=1.2 μm and W=2.8 μm.

These curves were obtained experimentally by varying Lc from 0 to 450 μm for wavelengths 1260 nm (curve 41), 1360 nm (curve 42), 1480 nm (curve 43) and 1660 nm. (curve 44).

Thus, according to equation 1 and as shown in FIG. 3, the division ratio CR between the guide output arms is a sinusoidal function of $L_{strong}$ and therefore of Lc. Therefore, the parameter Lc provides a way to adjust this division ratio. If strong coupling and weak coupling compensate for a given spectral window, then the variations of CR as a function of Lc, associated with the wavelengths of this spectral window, are sine curves that are very close to each other, as shown in FIG. 3. As the sine curves become more nearly coincident, the 2 to 2 divider element becomes more achromatic. The stucy of CR as a function of Lc provides a means of defining parameters for the divider element.

If periods of the sinusoidal function CR(Lc) are longer at high wavelengths than at low wavelengths, then the strong coupling zone (essentially part II) overcompensates for the weak coupling zones (parts I and III). In this case, Dc and/or W have to be increased to give good chromatic compensation between these two zones.

Figure 4:
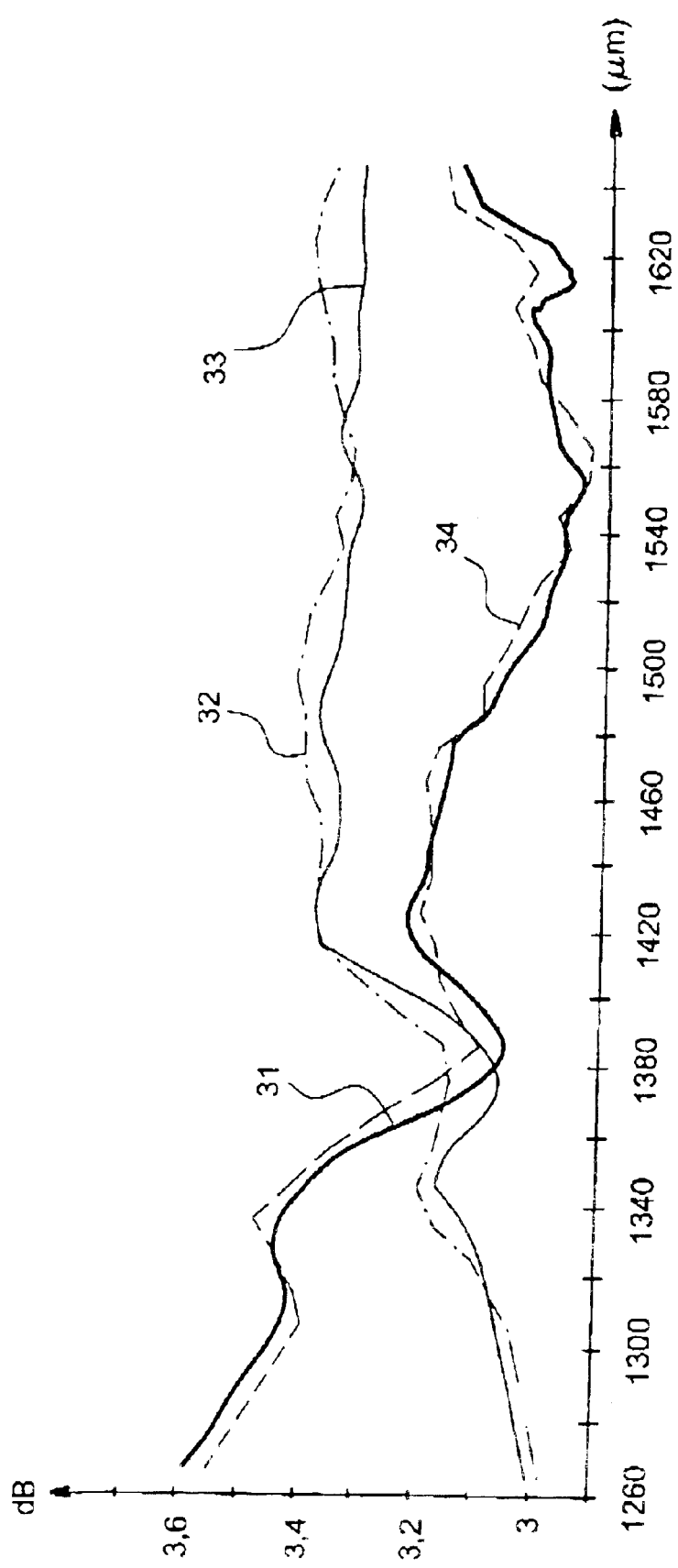
FIG. 4 diagrammatically shows the spectral response of the device in FIG. 2.

The curves in FIG. 4 illustrate total losses (including excess losses) of the light wave between the input through one of the guides and the output of this wave through one of the guides, as a function of the wavelengths, for a 2 to 2 divider element like that shown in FIG. 2.

Thus, losses are sown for a wave E:
input through guide G1 and output through guide G1 (curve $E_{G1}$, S1 reference 31),
input through guide G1 and output through guide G2 (curve $E_{G1}$, S2 reference 32), input through guide G2 and output through guide G1 (curve $E_{G2}$, S1 reference 33), input through guide G2 and output through guide G2 (curve $E_{G2}$, S2 reference 34).

These curves were obtained for a 2×2 divider element in which Lc=220 μm, CR–0.5. Excess losses of this element are weak and are less than 0.15 dB.

It can be seen in FIG. 4 that total losses in the 1260–1360 nm and 1480–1660 nm spectral windows do not vary by more than 0.5 dB. Therefore, it can be said that this divider element is very slightly chromatic and has very low excess losses.

According to one advantageous mode, the following can be chosen for a 2×2 divider element according to one embodiment of the invention with a division ratio of 0.5 and operating in the 1260–1360 nm and 1480–1660 nm spectral windows:

guide widths W such that W<Wc, where Wc is the maximum width for which the guides are single-mode for wavelengths greater than 1260 nm, a radius of curvature R of guides in parts I and III such that R=Rc, where Rc is the minimum radius of curvature for which curvature losses at 1660 nm are not negligible, Dc and W such that curves showing the variation of the division ratio CR as a function of Lc are coincident for wavelengths within the 1260–1360 nm and 1480–1660 nm spectral windows, Lc such that the division ratio CR is equal to 0.5.

For example, we can choose:

Dc between 0.6 and 2.6 μm,

W between 1.6 μm and Wc,

Lc between 0 and 450 μm.

Figure 5:
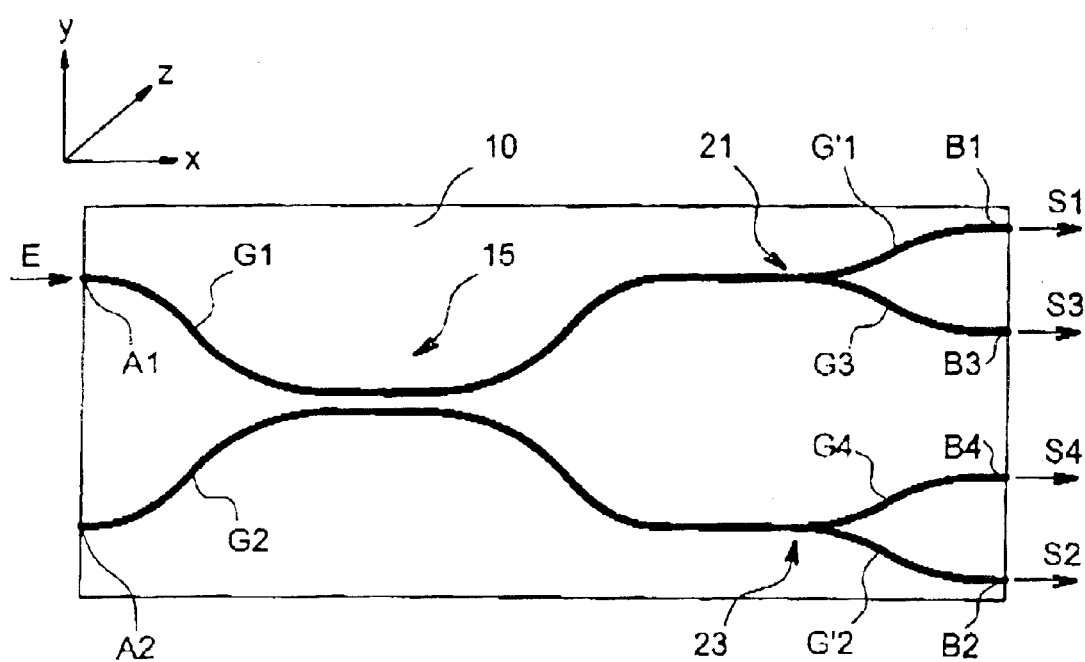
FIG. 5 diagrammatically shows a first variant embodiment of a 2 to n divider, where n is greater than 2.
Figure 6:
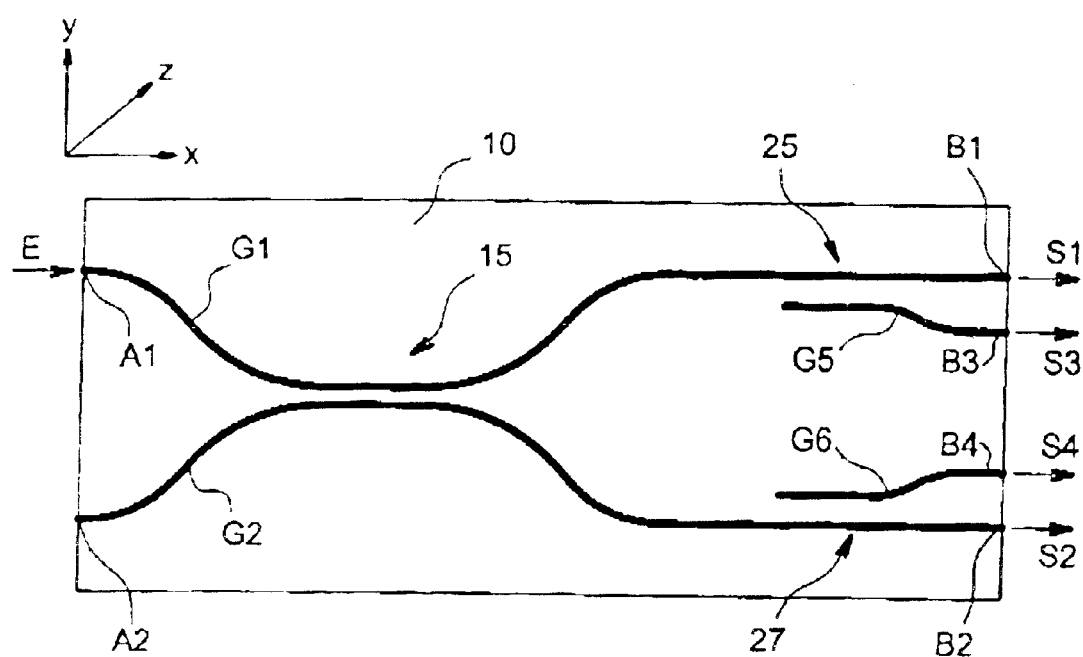
FIG. 6 diagrammatically shows a second variant embodiment of a 2 to n divider when n is greater than 2.

FIGS. 5 and 6 diagrammatically show a 2 to n divider according to the invention in the special case of n equal to 4.

These figures illustrate a partial section of the substrate 10, in the xy plane containing the different propagation directions of light waves in the divider according to the invention.

This divider comprises a 2 to 2 type divider element 15 in the substrate 10 like that described with reference to FIG. 2 cascaded with two 1 to 2 type divider elements that may or may not be symmetric.

Thus, each of the output ends of the guides G1 and G2 of the element 15 is optically connected to a 1 to 2 type divider such that the divider finally contains two inputs reference A1 and A1 into which a wave E can be input, and 4 outputs reference B1, B2, B3, B4 that can output waves S1, S2, S3, S4 respectively at the output.

FIG. 5 shows two 1 to 2 divider elements made by Y junctions referenced 21 and 23, junction 21 being connected to guide G1 while junction 23 is connected to guide G2. Junction 21 also comprises two output guides G1 to output the output wave S1 and G3 to output the output wave S3; the junction 23 also comprises two output guides G2 to produce the output wave S2, and G4 to produce the output wave S4.

Division ratios between the different arms of each Y junction different from 0.5 can be obtained by varying the section of junction output guides and/or the angle between the junction output guides and the optical axis of the junction input guide.

In FIG. 6, the two 1 to 2 divider elements are made by couplers 25 and 27. The coupler 25 is made by guide G1 and a guide G5, part of which is located close to the guide G1 in order to couple parts of the wave transported in guide G1, in guide G5. Therefore, guides G1 and G5 produce output saves S1 and S3. The coupler 27 is made by the guide G2 and a guide G6, part of which is located close to guide G2 to couple part of the wave transported within guide G2, in guide G6. Therefore, guides G2 and G2 output saves S2 and S4.

Division ratios other than 0.5 between the different coupler outputs can be obtained by varying the interaction length of the coupler and/or the section of the different coupler output guides.

What is claimed is:

1. A 2 to n divider with integrated optics, where n is an integer greater than or equal to 2, including at least one 2 to 2 optical divider element in a substrate, said divider element comprising:

a first and a second guide with widths equal to W1 and W2 respectively, said divider element adapted to divide an input light wave input into one of the first and second guides, into a first and second output wave, said first and second output wave transported by the first and second guides respectively;

wherein said first and second guides each comprise at least three parts:

a first part, of a first coupling type, wherein the first and second guides are progressively separated by smaller distance proceeding from input ends thereof, to a distance Dc that is not zero and is less than a threshold distance Ds, said distance Ds corresponding to the minimum distance starting from which the input light wave input into one of the first and second guides can be at least partly coupled into the other guide, a second part, of a second coupling type, with a coupling length Lc, along which said first and second guides are substantially parallel to each other and are distant from each other by the value Dc, and a third part, of the first coupling type, in which the first and second guides are progressively separated by a longer distance starting from the value Dc until they are separated by a value of more than Ds, wherein the values Dc, Lc, W1 and W2 are selected so as to obtain an achromatic divider element at divider operating wavelengths, and the values Dc and Lc are selected so that the first coupling type and the second coupling type vary inversely with said wavelengths.

2. The divider according to claim 1, wherein the first and second guides of the 2 to 2 divider element are single mode.

3. The divider according to claim 1, wherein the substrate is glass and the first and second guides are made by ion exchange in the substrate.

4. The divider according to claim 1, wherein the first and the second guides have widths W1 and W2, respectively, such that the 2 to 2 divider element is achromatic in operational spectral windows from 1260 to 1360 nm and from 1480 to 1660 mm.

5. The divider according to claim 1, wherein distances between the first and second guides vary symmetrically.

6. The divider according to claim 1, wherein the value Dc is less than or equal to the value Dx, wherein Dx corresponds to a distance separating the first and second guides at which coupling between said guides changes from coupling in which longer wavelengths are preferentially coupled to coupling in which shorter wavelengths are preferentially coupled.

7. The divider according to claim 1, wherein in the first and third parts of the 2 to 2 divider element, the first and second guides are curved with a radius $R \geq Rc$, or according to a sinusoidal function with a minimum radius of curvature $R \geq Rc$, where the value Rc is defined as a critical radius of curvature above which there are substantially no curvature losses at a highest operating wavelength.

8. The divider according to claim 7, wherein R=Rc.

9. The divider according to claim 1,
wherein the divider element operates in 1260–1360 nm and 1480–1660 nm spectral windows and has a division ratio CR equal to 0.5,
wherein the widths W1 and W2 are selected to vary from 1.6 μm to Wc,
wherein the distance Dc varies from 0.6 μm to 2.6 μm and the length Lc varies from 0 μm to 450 μm, where Wc is the maximum width for which the first and second guides are single mode for said spectral windows.

10. The divider according to claim 1, wherein n is greater than 2, and said divider comprises a 2 to 2 optical divider element and (n−2) 1 to 2 cascaded divider elements such that the divider comprises two inputs corresponding to the first and second guides of the 2 to 2 divider element, and n outputs.

11. The divider according to claim 10, wherein the (n−2) 1 to 2 divider elements are selected from the group consisting of Y couplers, junctions and combinations thereof.

* * * * *